(12) United States Patent
Tseng

(10) Patent No.: US 9,126,312 B2
(45) Date of Patent: Sep. 8, 2015

(54) POSITIONING FIXTURE FOR SHEARING

(71) Applicant: Min-Tsang Tseng, New Taipei (TW)

(72) Inventor: Min-Tsang Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 241 days.

(21) Appl. No.: 13/658,090

(22) Filed: Oct. 23, 2012

(65) Prior Publication Data
US 2013/0161890 A1 Jun. 27, 2013

(51) Int. Cl.
*B25B 1/00* (2006.01)
*B25B 1/24* (2006.01)
*B23Q 3/10* (2006.01)
*B25B 1/10* (2006.01)
*B25B 5/10* (2006.01)
*B25B 5/16* (2006.01)

(52) U.S. Cl.
CPC .............. *B25B 1/2405* (2013.01); *B23Q 3/104* (2013.01); *B25B 1/103* (2013.01); *B25B 5/10* (2013.01); *B25B 5/163* (2013.01)

(58) Field of Classification Search
USPC ....... 269/43, 45, 254 CS, 152, 309–310, 156, 269/196, 217, 229
See application file for complete search history.

(56) References Cited

U.S. PATENT DOCUMENTS

| | | | | |
|---|---|---|---|---|
| 5,307,977 A | * | 5/1994 | Park | 228/4.5 |
| 5,735,513 A | * | 4/1998 | Toffolon | 269/43 |
| 6,126,158 A | * | 10/2000 | Engibarov | 269/136 |
| 6,953,188 B2 | * | 10/2005 | Siegel | 269/266 |
| 2010/0320666 A1 | * | 12/2010 | Teo | 269/43 |
| 2012/0268150 A1 | * | 10/2012 | Luo et al. | 324/750.16 |

* cited by examiner

*Primary Examiner* — Lee D Wilson
*Assistant Examiner* — Nirvana Deonauth
(74) *Attorney, Agent, or Firm* — Novak Druce Connolly Bove + Quigg LLP

(57) ABSTRACT

A positioning fixture includes a support base and two clamping assemblies. The support base includes a support surface defining a positioning hole and two sliding slots. The two clamping assemblies are mounted in the two sliding slots respectively, and partly protruding out from the support surface. Each of the clamping assemblies includes a pair of clamping blocks and a pair of elastic members. The pair of clamping blocks is slidably engaged in the corresponding sliding slot. The pair of elastic members is mounted in two ends of the corresponding sliding slot to resist one of the pair of the clamping blocks against the other one of the pair of the clamping blocks, respectively, such that the pair of the clamping blocks is capable of abutting and resisting each other.

18 Claims, 4 Drawing Sheets

POSITIONING FIXTURE FOR SHEARING

BACKGROUND

1. Technical Field

The present disclosure relates to fixtures, and particularly to a positioning fixture for positioning and clamping a piece of raw material during a shearing process.

2. Description of the Related Art

Many fixtures used in a shearing machine are made of copper alloy or aluminum alloy, with substantially rectangular plate shapes. In a shearing process, the fixtures are used as bearing members, and cannot precisely position and clamp a piece of raw material to be sheared, such that the piece of raw material is easily shaken and even destroyed during the shearing process, and the shearing machine may also move as well. Thus, the piece of raw material being clamped during shearing may be wasted, and the shearing efficiency is low.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
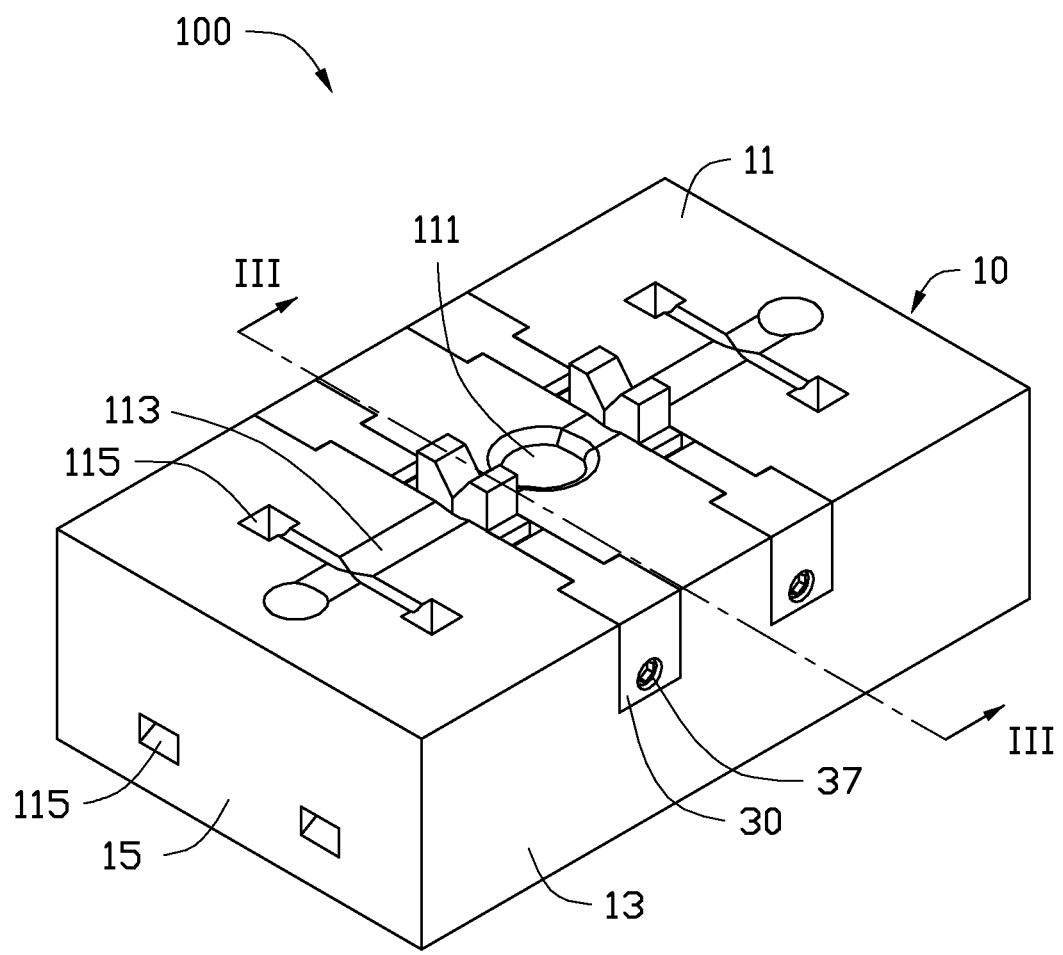
FIG. 1 is an assembled, isometric view of one embodiment of a positioning fixture.

FIG. 1 shows one embodiment of a positioning fixture 100 including a support base 10 and two clamping assemblies 30 symmetrically mounted on the support base 10.

Figure 2:
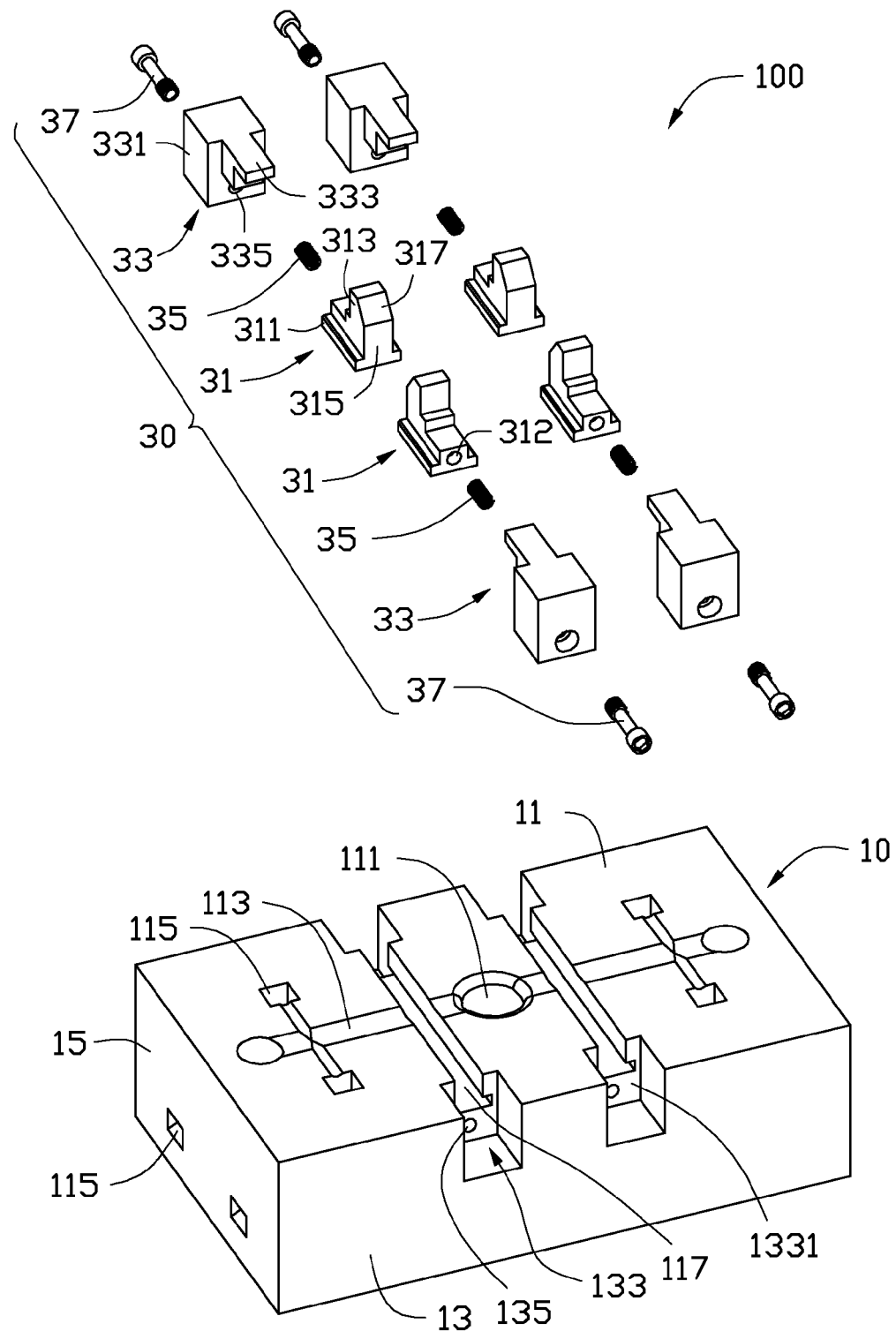
FIG. 2 is an exploded, isometric view of the positioning fixture of FIG. 1.
Figure 3:
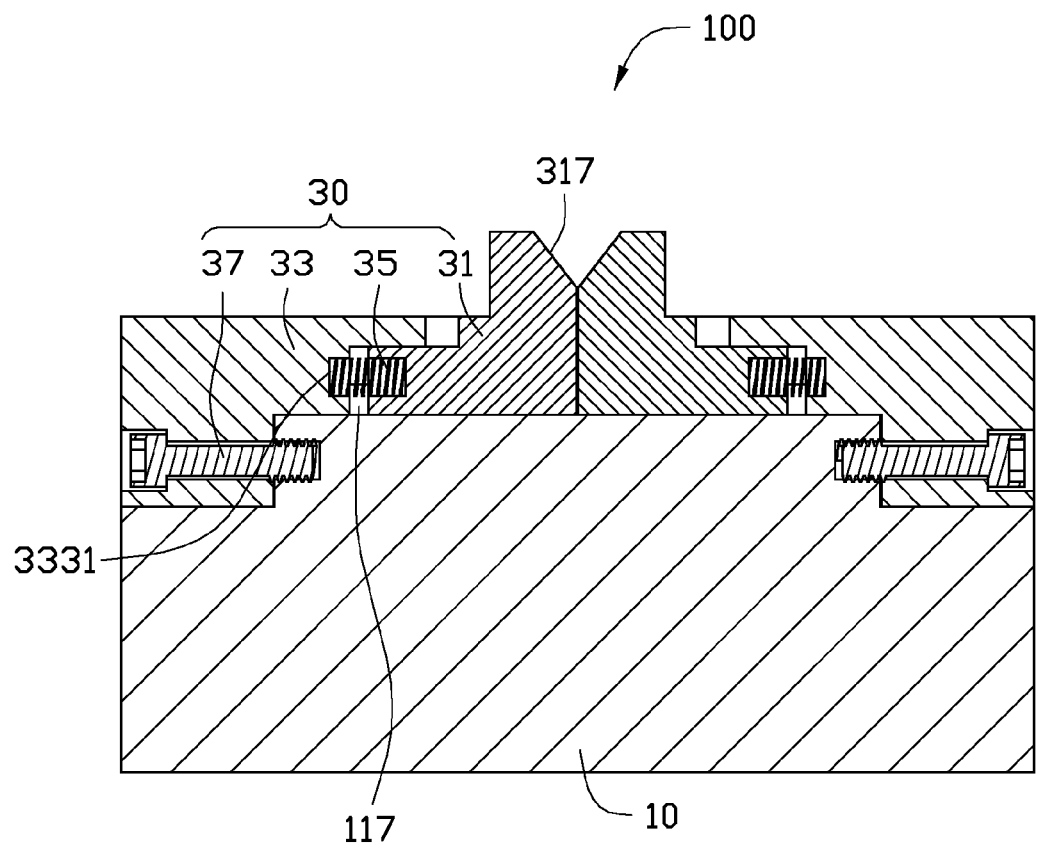
FIG. 3 is a cross-sectional view of the positioning fixture of FIG. 1, taken along line III-III.
Figure 4:
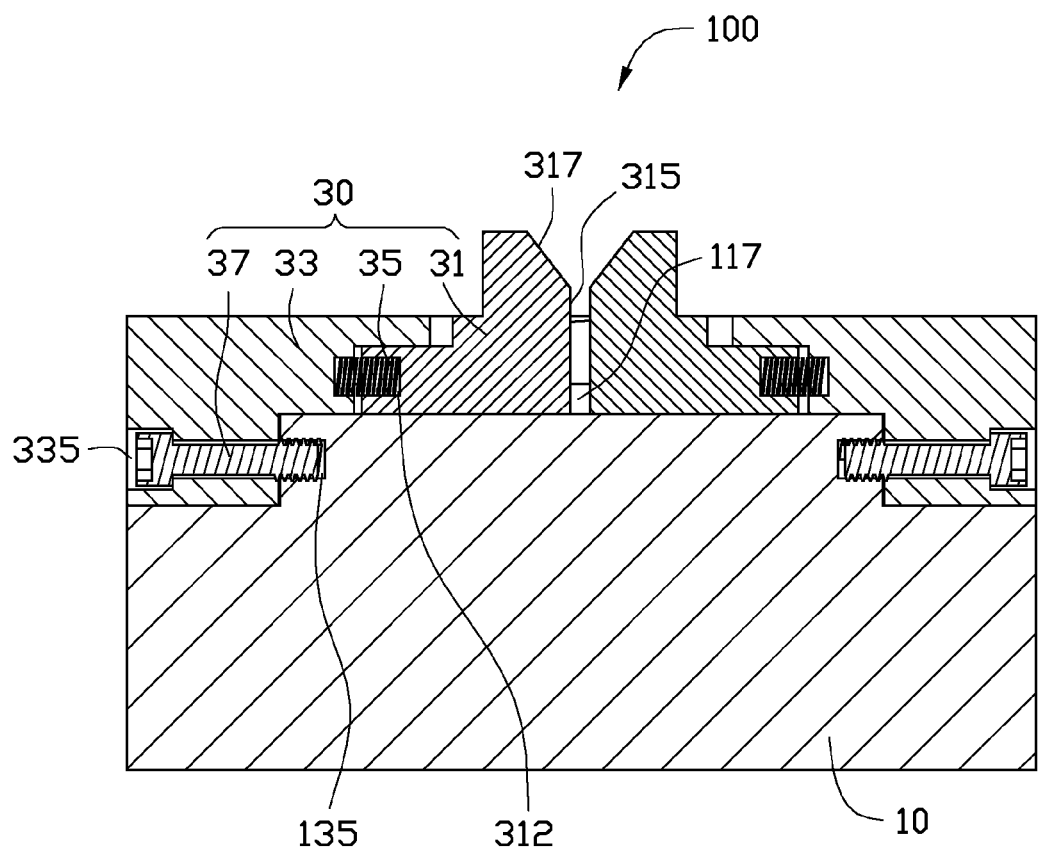
FIG. 4 is similar to FIG. 3, but shown in another state during operation.

Referring also to FIGS. 2 through 4, the support base 10 is substantially a rectangular block, and includes a support surface 11, two sidewalls 13 parallel to each other, and two end walls 15 parallel to each other. The two sidewalls 13 are perpendicular and connected to the support surface 11.

A positioning hole 111 is thoroughly defined substantially in a center of the support surface 11, for rapidly positioning of a piece of raw material (not shown) to be sheared on the support surface 11. Two positioning grooves 113 are symmetrically defined on two sides of the positioning hole 111, and communicating with the positioning hole 111. In an illustrated embodiment, each positioning groove 113 is substantially cross-shaped, and a bottom surface of the positioning grooves 113 is arcuate, to match a cylindrical shape of the piece of raw material. At least one unloading hole 115 is defined in the support surface 11 and penetrating through the corresponding end wall 15. The at least one unloading hole 115 communicates with one corresponding positioning groove 113. In the illustrated embodiment, two unloading holes 115 are symmetrically defined in the support surface 11 of the support base 10. Two sliding slots 117 are symmetrically defined in a center region of the support surface 11, along a direction perpendicular to the sidewalls 13. The positioning hole 111 is defined between the two sliding slots 117. A cross-section through each sliding slot 117 is substantially inverted T-shaped.

Two mounting grooves 133 are defined in an edge of each sidewall 13, spaced from each other and communicated with the corresponding sliding slot 117 and exposed of the support surface 11, respectively. A width of a cross-section of the mounting groove 133 taken along a direction parallel to the sidewalls 13 is greater than the width of the sliding slot 117. Each mounting groove 133 includes a bottom base surface 1331 parallel to the sidewalls 13. The sliding slot 117 penetrates through the corresponding bottom base surface 1331. A fixing hole 135 is defined in the bottom base surface 1331 below the sliding slot 117.

Two clamping assemblies 30 are mounted on the support base 10 along the direction perpendicular to the sidewalls 13, and are partly protruding out from the support surface 11, and spaced from each other, for fixing and clamping the piece of raw material placed on the support surface 11 for shearing. In the illustrated embodiment, each clamping assembly 30 includes a pair of clamping blocks 31, a pair of resisting blocks 33, a pair of elastic members 35, and a pair of fixing members 37. The pair of clamping blocks 31 is slidably mounted in the sliding slot 117 along the direction perpendicular to the sidewalls 13. The pair of resisting blocks 33 is securely mounted in the two mounting grooves 133 adjacent to opposite ends of the sliding slot 117, respectively, for resisting the pair of clamping blocks 31 mounted in the sliding slot 117, such that the pair of clamping blocks 31 is prevented from sliding out from the sliding slot 117. The pair of elastic members 35 is sandwiched between the resisting blocks 33 and the clamping blocks 31, correspondingly, such that the two clamping blocks 31 elastically resist against each other.

The clamping block 31 is substantially L-shaped, and includes a body portion 311 and a clamping portion 313 protruding out from one end of the body portion 311 along a direction perpendicular to the body portion 311. In the illustrated embodiment, a cross-section of the body portion 311 along the direction parallel to the sidewall 13 is substantially inverted T-shaped, and the dimensions of the cross-section of the body portion 311 is similar to that of the sliding slot 117, such that the body portion 311 is slidably mounted and received in the sliding slot 117. A mounting hole 312 is defined in an end surface of the body portion 311 away from the clamping portion 313, for receiving the elastic member 35. The clamping portion 313 is substantially wedged and is formed on the other end of the body portion 311 away from the mounting hole 312. The clamping portion 313 includes a clamping surface 315 formed on an end thereof and an inclined surface 317 connected to the clamping surface 315 away from the mounting hole 312, for guiding and matching with the pieces of raw materials with various sizes.

Each resisting block 33 includes a base portion 331 and a resisting portion 333 protruding out from the base portion 331. The base portion 331 is substantially rectangular. A size of the base portion 331 is similar to a size of the mounting groove 133, such that the base portion 331 is received in the mounting groove 133. A connection hole 335 is defined in the base portion 331. The connection hole 335 is stepped in shape, and configured corresponding to the fixing hole 135. The resisting portion 333 is substantially L-shaped, and adjacent to the connection hole 335, for being capable of slidably mounting together with the body portion 311 of the clamping block 31. Referring to FIG. 3, a mounting hole 3331 is defined in the resisting portion 333, corresponding to the mounting hole 312 in the clamping block 31, for receiving the elastic member 35.

Each elastic member 35 is elastically sandwiched between the clamping block 31 and the resisting block 33, and opposite ends of the elastic member 35 are received in the mounting hole 312 and the mounting hole 3331, respectively, such that the two clamping blocks 31 are abutting and resisting each other when found in a vacant state. In the illustrated embodiment, the elastic member 35 is a helix spring.

In the illustrated embodiment, the fixing member 37 is a threaded bolt.

In assembly, two clamping blocks 31 of one clamping assembly 30 are slidably mounted in the sliding slot 117 of the support base 10 from opposite ends of the sliding slot 117, such that the clamping portion 313 protrudes out of the support surface 11 from the sliding slot 117. Then, one end of each elastic member 35 is inserted into the mounting hole 312, and the other end of the each elastic member 35 protrudes out from the mounting hole 312. The two resisting blocks 33 are placed in the mounting grooves 133, respectively, opposite to each other and resisted to the two clamping blocks 31, respectively, and the other end of the each elastic member 35 is received in the mounting hole 3331. Thus, two clamping surfaces 315 of the two clamping portions 313 are resisting and abutting each other, and a V-shaped guiding groove (not labeled) is formed between two inclined surfaces 317 of the two clamping portions 313, for guiding and matching with the pieces of raw materials of various sizes for shearing. The two fixing members 37 pass through the connection holes 335 in the two resisting blocks 33, respectively, and are threadedly engaged with the two fixing holes 135, respectively, thereby assembling one clamping assembly 30. At last, the other clamping assembly 30 is assembled in the same method as described as that of the one clamping assembly 30, such that the positioning fixture 100 is thereby assembled completely.

In use, the positioning fixture 100 is mounted on the shearing machine (not shown), and the piece of raw material to be sheared is grasped and moved to a position above the support surface 11 by a robot arm (not shown). The piece of raw material is placed into the V-shaped guiding groove, and is pushed to the inclined surface 317 by a pushing force, such that the two clamping blocks 31 slide toward two sides of the support base 10, respectively, and the elastic members 35 are deformed to generate a clamping force between the two clamping blocks 31. After the piece of raw material passes through the V-shaped guiding groove, and is placed between the two clamping surfaces 315, the pushing force is being countered by the presence of the piece of raw material. Thus, the piece of raw material is securely clamped and positioned on the support surface 11 to be sheared.

The positioning fixture 100 has a simple structure and an easy operation. Because the two clamping assemblies 30 are mounted on the support base 10 and protruded out from the support surface 11, and the positioning hole 111 and the positioning groove 113 are defined in the support surface 11, the piece of raw material that is sheared, is positioned and clamped rapidly, and is prevented from shaking and deviating from the original clamped position during the shearing process. Thus, a shearing efficiency and yield are improved greatly.

It is to be understood, however, that even through numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A positioning fixture, comprising:
   a support base comprising a support surface, the support surface defining a positioning hole and two sliding slots; and
   two clamping assemblies mounted in the two sliding slots of the support base, respectively, and partly protruding out from the support surface; wherein each of the clamping assemblies comprises a pair of clamping blocks and a pair of elastic members, the pair of clamping blocks is substantially L-shaped and comprises a body portion and a clamping portion protruding out from one end of the body portion, the body portion is slidably mounted in the corresponding sliding slot, the clamping portion is substantially wedged and protrudes out from the support surface, and the pair of elastic members is mounted in two ends of the corresponding sliding slot to resist one of the pair of the clamping blocks with the other one of the pair of the clamping blocks, respectively, such that the pair of the clamping blocks is capable of resisting and abutting each other.

2. The positioning fixture of claim 1, wherein the positioning hole is a through hole defined in a substantially center of the support surface.

3. The positioning fixture of claim 2, wherein the support base comprises two sidewalls parallel to each other and connected to the support surface, and the two sliding slots are symmetrically defined in the support surface along a direction perpendicular to the sidewalls.

4. The positioning fixture of claim 3, wherein two mounting grooves are defined in an edge of each of the sidewalls communicated with the sliding slots and exposed of the support surface, respectively, the clamping assembly further comprises a pair of resisting blocks securely mounted in the two mounting grooves, respectively, and each of the pair of elastic members is sandwiched between one of the pair of the resisting blocks and the corresponding clamping block to generate an elastic force for the clamping block.

5. The positioning fixture of claim 1, wherein each of the clamping portions comprises a clamping surface formed on an end thereof adjacent to the other one of the pair of the clamping portions and an inclined surface connected to the clamping surface away from the body portion, and a V-shaped guiding groove is cooperatively defined by the inclined surfaces of the two clamping blocks.

6. The positioning fixture of claim 1, wherein a cross-section of the sliding slot taken along a direction parallel to the sidewalls is substantially inverted T-shaped, and a cross-section of the body portion taken along the direction parallel to the sidewalls is substantially inverted T-shaped, such that the body portion is slidably mounted in the sliding slot.

7. The positioning fixture of claim 1, wherein the resisting block comprises a base portion and a resisting portion protruding out from the base portion, the base portion is mounted and received in the mounting groove, and the resisting portion is slidably mounted together with the body portion of the clamping block.

8. The positioning fixture of claim 1, wherein the support surface defines two positioning grooves symmetrically in two sides of the positioning hole, communicated with the positioning hole.

9. The positioning fixture of claim 8, wherein the positioning groove is substantially cross-shaped, and a bottom surface of the positioning grooves is arcuate.

10. The positioning fixture of claim 9, wherein at least one unloading hole is defined in the support surface, penetrating through a periphery of the support base and communicating with the corresponding positioning groove.

11. A positioning fixture, comprising:
a support base comprising a support surface, the support surface defining a positioning hole in a substantially center thereof, two positioning grooves symmetrically defined on two sides of the positioning hole communicated with the positioning hole and two sliding slots; and
two clamping assemblies slidably mounted in the two sliding slots respectively, and partly protruding out from the support surface; wherein each of the clamping assemblies comprises a pair of clamping blocks and a pair of elastic members, the pair of clamping blocks is substantially L-shaped and comprises a body portion and a clamping portion protruding out from one end of the body portion, the body portion is slidably mounted in the sliding slot, the clamping portion is substantially wedged and protrudes out from the support surface, and the pair of elastic members is mounted in two ends of the corresponding sliding slot to resist one of the pair of the clamping blocks with the other one of the pair of the clamping blocks, respectively, such that the pair of the clamping blocks are capable of abutting and resisting each other.

12. The positioning fixture of claim 11, wherein the support base comprises two sidewalls parallel to each other and connected to the support surface, and the two sliding slots are symmetrically defined in the support surface along a direction perpendicular to the sidewalls.

13. The positioning fixture of claim 12, wherein two mounting grooves are defined in an edge of each of the sidewalls communicated with the sliding slots and exposed of the support surface, respectively, the clamping assembly further comprises a pair of resisting blocks securely mounted in the two mounting grooves, respectively, and each of the pair of elastic members is sandwiched between one of the pair of resisting blocks and the corresponding clamping block to generating an elastic force on the clamping block.

14. The positioning fixture of claim 11, wherein the clamping portion comprises a clamping surface formed on an end thereof adjacent to the other one of the pair of the clamping portions and an inclined surface connected to the clamping surface away from the body portion, and a V-shaped guiding groove is cooperatively defined by the inclined surfaces of the two clamping blocks.

15. The positioning fixture of claim 11, wherein a cross-section of the sliding slot taken along a direction parallel to the sidewalls is substantially inverted T-shaped, and a cross-section of the body portion taken along the direction parallel to the sidewalls is substantially inverted T-shaped, such that the body portion is slidably mounted in the sliding slot.

16. The positioning fixture of claim 11, wherein the resisting block comprises a base portion and a resisting portion protruding out from the base portion, the base portion is mounted and received in the mounting groove, and the resisting portion is slidably mounted together with the body portion of the clamping block.

17. The positioning fixture of claim 11, wherein the positioning groove is substantially cross-shaped, and a bottom surface of the positioning grooves is arcuate.

18. The positioning fixture of claim 17, wherein at least one unloading hole is defined in the support surface, penetrating through a periphery of the support base and communicating with the corresponding positioning groove.

* * * * *